May 3, 1966    W. E. JOHNSON ETAL    3,249,223
INSPECTING CONTAINERS WITH LUG FINISHES
Filed Sept. 25, 1963    3 Sheets-Sheet 1

INVENTORS
WILLIAM E. JOHNSON
& BENNY B. MATHIAS
BY
ATTORNEYS

May 3, 1966 W. E. JOHNSON ETAL 3,249,223
INSPECTING CONTAINERS WITH LUG FINISHES
Filed Sept. 25, 1963 3 Sheets-Sheet 2

INVENTORS
WILLIAM E. JOHNSON
& BENNY B. MATHIAS
BY
ATTORNEYS

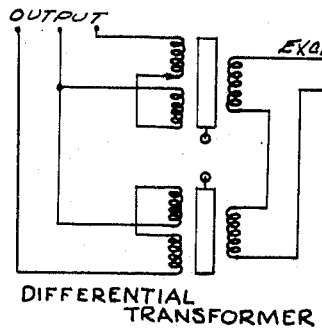
FIG. 5
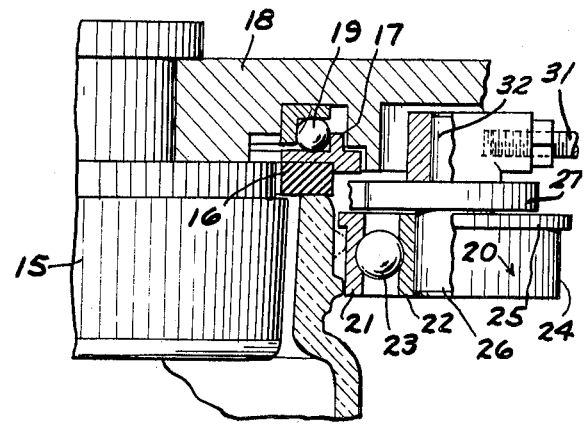
FIG. 6
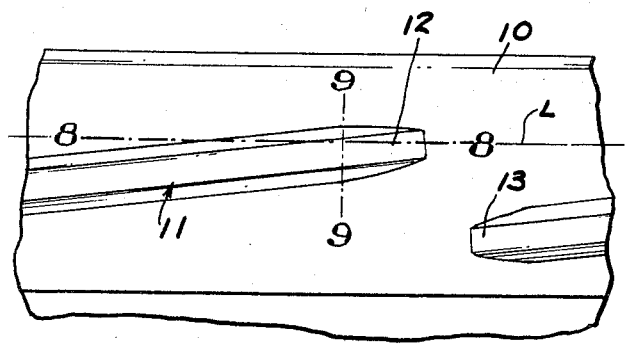
FIG. 7
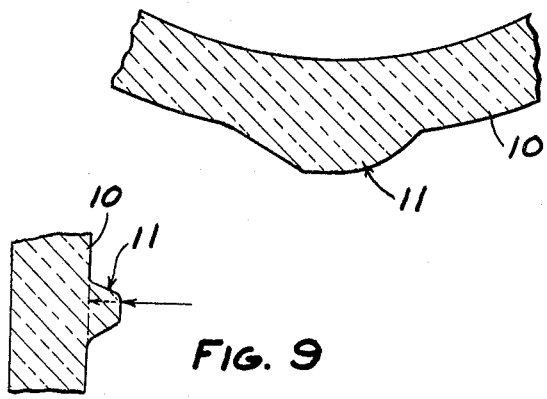
FIG. 8
FIG. 9

United States Patent Office 3,249,223
Patented May 3, 1966

3,249,223
INSPECTING CONTAINERS WITH LUG FINISHES
William E. Johnson, Toledo, and Benny B. Mathias, Maumee, Ohio, assignors to Owens-Illinois Inc., a corporation of Ohio
Filed Sept. 25, 1963, Ser. No. 311,460
17 Claims. (Cl. 209—88)

This invention relates to inspecting containers and particularly to inspecting containers with lug finishes for deviations from predetermined diametral dimensions.

In containers which have interrupted lug finishes in the form of helical lugs, the measurement of the diameter at the lug is made difficult by the fact that any contact member or gauge device brought into contact with the lugs has a tendency to move inwardly and outwardly as the leading and trailing edges of the lugs are reached.

It is an object of the invention to provide a method and apparatus for measuring the diameter of a container having a lug finish at the lugs and rejecting the container if the diameter deviates from predetermined tolerances.

It is a further object of the invention to provide a method and apparatus that combines physical contact with the lugs and optical conditioning by the lugs to measure the diameter and create a reject signal only when contact members are in proper position with respect to the lugs for measuring diameter.

In the drawings:

FIG. 5 is a diagram of the differential transformer circuit utilized in the apparatus.

FIG. 6 is a fragmentary sectional view on an enlarged scale taken along the line 6—6 in FIG. 1.

FIG. 7 is a fragmentary view of a portion of the lug finish which is to be inspected.

FIG. 8 is a fragmentary sectional view taken along the line 8—8 in FIG. 7.

FIG. 9 is a fragmentary sectional view taken along the line 9—9 in FIG. 7.

Figure 1:
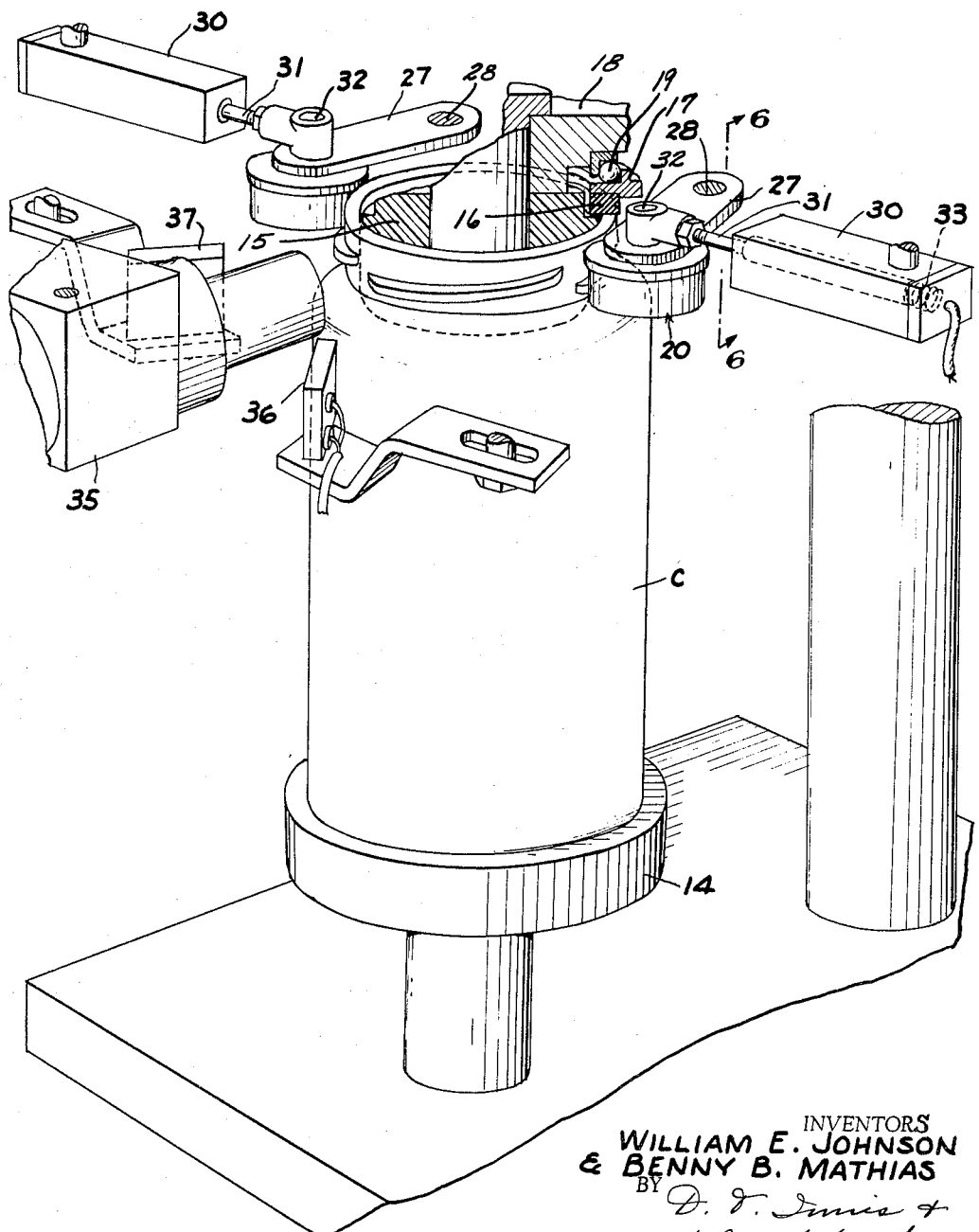
FIG. 1 is a part sectional fragmentary perspective view of an apparatus embodying the invention.

Referring to FIGS. 1, 7, 8 and 9, the container C which is to be inspected may be made of glass and comprises a generally cylindrical neck 10 that has interrupted threads defined by helical lugs 11. Each lug 11 includes a tapered leading edge 12 and corresponding tapered trailing edge 13. In the container shown, four lugs are provided, each having an angular extent of 90 degrees but in some finish designs the trailing end of a lug overlaps the beginning of a successive lug.

In accordance with the invention, the container C is placed on a pad 14 and rotated about its axis. A neck pad 15 is provided on the upper end of the container and includes a resilient gasket 16 mounted on a ring 17 which, in turn, is rotatably mounted on the head plate 18 by ball bearings 19. In this manner, the container C is held rigidly on the pad 14 so that it can be rotated.

In accordance with the invention, a pair of contact or measuring rollers 20 are yieldingly urged in engagement with the periphery of the neck finish. The rollers thus move radially to conform to the outer shape of the container. When the rollers 20 are in contact with the radially outermost portions of the helical lugs 11, the positions of the rollers 20 correspond to the diameter of the finish.

As shown in FIG. 6, each roller 20 comprises an outer ring 21 which is rotatably mounted on an inner ring 22 by ball bearings 23. The outer ring 21 includes a cylindrical surface 24 which engages the helical lugs 11. At its upper end, the outer ring 21 includes a radially outwardly projecting shoulder 25. The shoulder 25 engages the cylindrical neck finish 10 when thhe outer ring surface 24 moves into the area between the trailing edge 13 of one lug 11 and the leading edge 12 of a succeeding lug 11. By this arrangement, the roller moves inwardly and outwardly a lesser amount and there is less tendency for the rollers to be thrown radially outwardly by sudden engagement with the leading edge 12 of a succeeding lug 11.

As shown in FIGS. 1 and 6, the inner ring 22 of each roller is mounted on a post 26 that is fixed on a lever 27 hinged on a vertical pin 28 on plate 18. The core of a differential transformer 30 is connected by a shaft 31 to a pin 32 mounted on the lever 27 with its axis in alignment with the axis of the post 26. The differential transformer 30 includes a spring 33 that yieldingly urges the core of the transformer and, in turn, the rod 31 and roller 20 into engagement with the periphery of the container. The transformers 30 are connected in opposition as shown schematically in FIG. 5 so that the movement of both cores is coordinated such that when the cores move in the same direction and to the same degree there is no differential output but if the cores move in opposite directions either singly or simultaneously an output will be produced depending upon the relative movements of the cores. As a result, the output of the differential transformers will be a function of the change of diameter.

Figure 3:
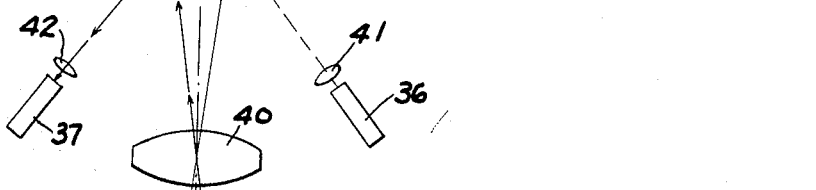
FIG. 3 is a view similar to FIG. 2 with the parts in position for no measurement of diameter.
Figure 3:
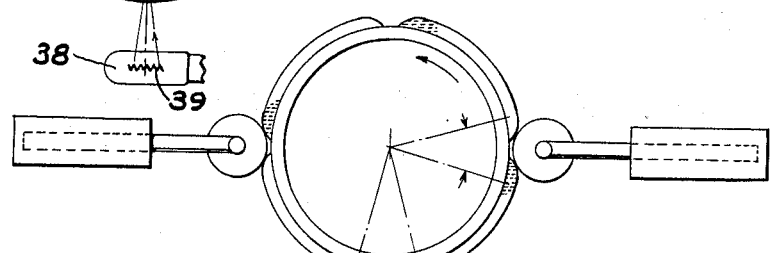

The output of the differential transformers is caused to create a reject signal if the output deviates from a predetermined standard by a predetermined amount. It is required that this reject signal be produced only when the rollers 20 are actually measuring the diameter of the radially outermost portions of the lugs 11 and to obviate any possibility of creating a reject signal when the rollers 20 are in the valleys between the leading and trailing edges 12, 13 of the lugs 11 as shown in FIG. 3.

In order to achieve this, an optical system is provided for creating a conditioning signal only when the rollers 20 are in contact with the radially outermost portions of the lugs. As shown in FIG. 1, the optical system comprises a light source 35 which is adapted to direct and focus a beam of light radially on the periphery of the neck 10 in the area of the upper ends of the lugs represented by the line L in FIG. 7. A pair of light sensitive elements in the form of silicon detectors 36, 37 are provided at opposite sides of the light beam with their lines of vision at an acute angle and intersecting the light beam at the finish. The relationship of the light source and light sensitive elements is shown schematically in FIGS. 2 and 3. The light source including the incandescent element 38 having a filament 39 which is focused by a lens 40 in a rectangular image that has its longest dimension at right angles to the axis of the container and along the line L (FIG. 7). Light sensitive element 36 preferably has a collecting lens 41 associated therewith so that light reflected from the neck finish to the element 36 is focused on the element 36. Similarly, light sensitive element 37 preferably has a collecting lens 42 associated therewith for collecting the light passing thereto from the neck finish.

Figure 2:
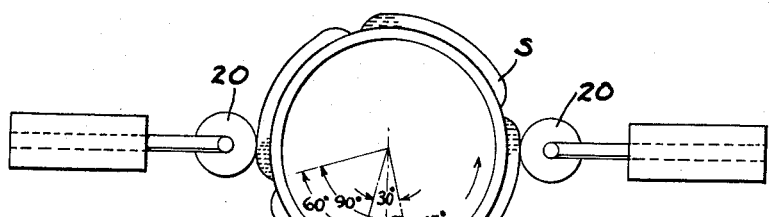
FIG. 2 is a partly diagrammatic view of the apparatus shown in FIG. 1 with the parts in diameter sensing position.

When the light beam is focused on the cylindrical portion 10 of the neck finish, light is reflected to both of the light sensitive elements 36, 37. However, when the leading edge represented by the shaded area S in FIGS. 2 and 3 of a lug 11 moves into the path of the light beam, as the container is moving counterclockwise as shown in FIGS. 2 and 3, a portion of the light will be reflected on both the horizontal plane and the vertical plane so that less light will be reflected to the light sensitive element 36. In accordance with the invention, at this point in the rotation of the container, the rollers 20 are in contact with the radially outermost portions of the lugs 11 and the circuit with which the differential transformers are associated can be conditioned for creating a reject signal if necessary. The detector 37 is positioned such that as the leading edge 12 of a succeeding lug 11 enters the path of the light beam, a portion of the light normally reflected to the light sensitive element 37 is redirected both horizontally and vertically out of the path and therefore there is a diminution in the light to the light sensitive element 37. This occurs after 60° of rotation, permitting rollers 20 to ride on thread for another 30° before falling in the valleys between the lugs 11, at which time it is desired that the circuit associated with the differential transformers be immobilized during this interval.

Figure 4:
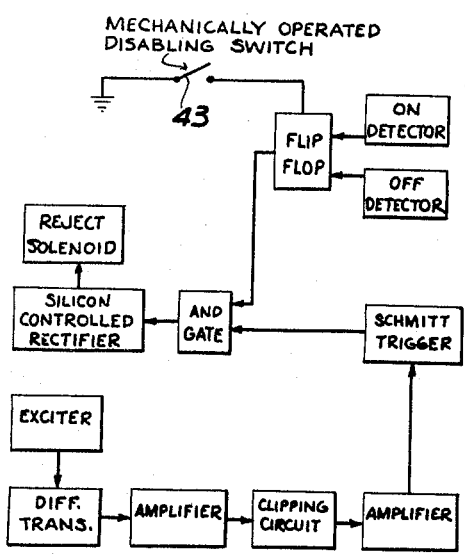
FIG. 4 is a schematic diagram of the electrical system associated with the apparatus.

The manner in which the energization of the light sensitive elements 36, 37 is used to control the circuit is shown by reference to FIG. 4 which is a schematic diagram of the circuit. For reference purposes, the light sensitive element 36 is designated the "on" detector and the light sensitive element 37 is designated the "off" detector.

Referring to FIG. 4, when a container C is placed on the pad 14, a switch 43 is actuated either manually or by the movement of the container C onto the pad 14. As the container then is rotated, the rollers 20 conform to the outer diameter moving inwardly into contact with the finish 10 or outwardly into contact with the periphery of the lugs. As the leading edge 12 of one of the lugs 11 moves into the path of the light beam, the light sensitive element 36 is caused to create a signal, represented by the "on" detector in FIG. 4, to gate the flip-flop and provide a signal to the AND gate. Simultaneously, the differential transformers are excited by an audio frequency signal. The output of the differential transformers, corresponding to the diameter measured by the rollers at any instant, is amplified and changed to a digital form by a Schmitt trigger circuit. The pulse output from the Schmitt trigger circuit is gated to the AND gate. If a circuit from the flip-flop, indicating that the rollers 20 are on the lugs is provided by the "on" detector or light sensitive element 36, a reject signal will pass through the AND gate and silicon control rectifier and, in turn, energize a reject solenoid. The reject solenoid can be energized directly to reject the container, create a visual signal, or energize a time delay circuit for rejecting the container at some subsequent point in its handling.

As the container continues to rotate, the movement of a succeeding lug into the path of the "off" detector or light sensitive element 37 actuates a flip-flop to prevent the signal from passing to the AND gate so that even though there is a signal from the differential transformer, there will be no resultant reject signal to the reject solenoid.

As shown in FIGS. 2 and 3, the arrangement of the light beam and light sensitive elements 36, 37 is made with respect to a container having four lugs. As shown, the position of the beam and elements 36, 37 is such that light sensitive element 36 conditions the circuit during 60 degrees of rotation of the detector and light sensitive element 37 de-activates the system during the remaining 30 degrees of rotation, corresponding to the four equal or 90 degree spacings of the lugs.

When the apparatus is used to inspect containers having a different number of lugs, the light beam, and light sensitive elements 36, 37 are positioned such that the circuit is conditioned when the rollers 20 are in engagement with the radially outermost portions of the lugs and is de-activated when the rollers 20 approach the trailing edges of the lugs and the valleys between the lugs.

The term "light" as used herein is intended to cover all forms of radiant energy which are capable of being reflected by the surfaces of the lugs of the container.

What is claimed is:

1. The method of inspecting containers having interrupted helical lugs on the neck finish thereof to determine the diameter of said container at said lugs which method comprises the steps of bringing circumferentially spaced contact members into contact with the periphery of said finish adjacent the upper ends of said helical lugs, causing relative rotation between the container and said members whereby said contact members successively contact the upper ends of said lugs and said neck proper and said members when in contact simultaneously with the radially outermost portions of the lugs indicate the diameter of said container at said lugs, directing a beam of radiant energy against the periphery of the finish adjacent the upper ends of said lugs, causing one end of a lug to direct said light beam in a different direction than that to which the light beam is directed when the beam strikes the body portion of the neck, creating a conditioning signal when said end of the lug directs the beam of radiant energy in said different direction, creating a reject signal when the diameter of said lugs as determined by said contact members varies from predetermined tolerances and only when a conditioning signal is produced by engagement of said beam with the main body of the lugs, and rejecting the container in response to said reject signal.

2. The method of inspecting containers having interrupted helical threads on the neck finish thereof to determine the diameter of said container at said lugs which method comprises the steps of bringing circumferentially spaced contact members into contact with the periphery of said finish adjacent the upper ends of said helical lugs, causing relative rotation between the container and said members whereby said contact members successively contact the upper ends of said lugs and said neck proper and said members when in contact simultaneously with the radially outermost portions of the lugs indicate the diameter of said container at said lugs, directing a beam of radiant energy against the periphery of the finish adjacent the upper ends of said lugs, causing the leading edge of a lug to create a conditioning signal by redirection of the light beam as the container is rotated, causing the leading edge of a succeeding lug to interrupt the conditioning signal by redirecting a portion of the beam out of its normal path, and creating a reject signal when the diameter of said lugs as determined by said contact members varies from predetermined tolerances and only during the interval of the conditioning signal.

3. The method of inspecting containers having interrupted helical threads on the neck finish thereof to determine the diameter of said container at said lugs which method comprises the steps of bringing circumferentially spaced contact members into contact with the periphery of said finish adjacent the upper ends of said helical lugs, causing relative rotation between the container and said members whereby said contact members successively contact the upper ends of said lugs and said neck proper and said members when in contact simultaneously with the radially outermost portions of the lugs indicate the diameter of said container at said lugs, directing a beam of radiant energy substantially radially against the periphery of the finish adjacent the upper ends of said lugs, causing the leading edge of a lug to create a conditioning signal by redirection of the light beam as the container is rotated, causing the leading edge of a succeeding lug to interrupt the conditioning signal by redirecting a portion of the beam out of its normal path as the container is rotated, and creating a reject signal when the diameter of said lugs as determined by said contact members varies from predetermined tolerances and only during the interval of the conditioning signal.

4. The method of inspecting containers having interrupted helical threads on the neck finish thereof to determine the diameter of said container at said lugs which method comprises the steps of bringing circumferentially spaced contact members into contact with the periphery of said finish adjacent the upper ends of said helical lugs, causing relative rotation between the container and said members whereby said contact members successively contact the upper ends of said lugs and said neck proper and said members when in contact simultaneously with the radially outermost portions of the lugs indicate the diameter of said container at said lugs, directing a beam of radiant energy against the periphery of the finish adjacent the upper ends of said lugs, positioning a first light sensitive element adjacent the periphery of said finish with its line of vision intersecting said beam at the finish, causing the leading edge of a lug to create a conditioning signal by redirection of the light beam to said first light sensitive element as the container is rotated, positioning a second light sensitive element adjacent the periphery of said finish with its line of vision intersecting said beam at said finish, causing the leading edge of a succeeding lug to interrupt the conditioning signal by redirecting a portion of the beam out of its normal path to said second light sensitive element as the container is rotated, and creating a reject signal when the diameter of said lugs as determined by said contact members varies from predetermined tolerances and only during the interval of the conditioning signal.

5. The method of inspecting containers having interrupted helical threads on the neck finish thereof to determine the diameter of said container at said lugs which method comprises the steps of bringing circumferentially spaced contact members into contact with the periphery of said finish adjacent the upper ends of said helical lugs, causing relative rotation between the container and said members whereby said contact members successively contact the upper ends of said lugs and said neck proper and said members when in contact simultaneously with the radially outermost portions of the lugs indicate the diameter of said container at said lugs, directing a beam of radiant energy substantially radially against the periphery of the finish adjacent the upper ends of said lugs, positioning a first light sensitive element with its line of vision at an acute angle and in advance of the light beam, positioning a second light sensitive element with its line of vision intersecting said light beam at the finish at an acute angle and rearwardly of the light beam, causing the leading edge of a lug to redirect light from its normal path of reflection to said first light sensitive element, creating a conditioning signal in response to the reduction in light passing to the first light sensitive element, causing the leading edge of a successive lug to redirect a portion of said light beam out of its normal path of reflection to said second light sensitive element, terminating the conditioning signal in response to the reduction of reflection of light to said second light sensitive element, and causing a reject signal when the diameter of said lugs as determined by said contact members varies from predetermined tolerances and only during the conditioning signal.

6. The method of inspecting containers having interrupted helical threads on the neck finish thereof to determine the diameter of said container at said lugs which method comprises the steps of bringing circumferentially spaced diametrally opposed contact members into contact with the periphery of said finish adjacent the upper ends of said helical lugs, causing relative rotation between the container and said members whereby said contact members successively contact the upper ends of said lugs and said neck proper and said members when in contact simultaneously with the radially outermost portions of the lugs indicate the diameter of said container at said lugs, creating a conditioning signal as the contact members engage said lugs, and creating a reject signal when the diameter of said lugs as determined by said contact members varies from predetermined tolerances and only during the conditioning signals.

7. The method of inspecting containers having interrupted helical threads on the neck finish thereof to determine the diameter of said container at said lugs which method comprises the steps of bringing circumferentially spaced diametrally opposed contact members into contact with the periphery of said finish adjacent the upper ends of said helical lugs, causing relative rotation between the container and said members whereby said contact members successively contact the upper ends of said lugs and said neck proper and said members when in contact simultaneously with the radially outermost portions of the lugs indicate the diameter of said container at said lugs, directing a beam of radiant energy substantially radially against the periphery of the finish adjacent the upper ends of said lugs, positioning a first light sensitive element with its line of vision at an acute angle and in advance of the light beam, positioning a second light sensitive element with its line of vision intersecting said light beam at the finish at an acute angle and rearwardly of the light beam, causing the leading edge of a lug to redirect light from its normal path of reflection to said first light sensitive element, creating a conditioning signal in response to the reduction in light passing to the first light sensitive element, causing the leading edge of a successive lug to redirect a portion of said light beam out of its normal path of reflection to said second light sensitive element, terminating the conditioning signal in response to the reduction of reflection of light to said second light sensitive element, and causing a reject signal when the diameter of said lugs as determined by said contact members varies from predetermined tolerances and only during the conditioning signal.

8. An apparatus for inspecting containers having interrupted helical threads on the neck finish thereof to determine the diameter of the container at said lugs which comprises means for supporting the container for rotation about its axis, a pair of diametrally opposed contact members in contact with the periphery of said finish adjacent the ends of the helical lugs,
sensing means associated with said contact members,
said contact members when in engagement with said lugs measuring the diameter of said container at said lugs,
means for directing a beam of radiant energy against the periphery of the finish adjacent the ends of said lugs,
light sensitive means having a line of vision intersecting the beam at the periphery of the finish for creating a conditioning signal when the contact members are in engagement with the lugs,
and reject means associated with and conditioned by said light sensitive means for creating a reject signal when the sensing means indicates that the diameter of the lugs varies from predetermined tolerances during the interval of the conditioning signal.

9. An apparatus for inspecting containers having interrupted helical threads on the neck finish thereof to determine the diameter of the container at said lugs which comprises
means for supporting the container for rotation about its axis,
a pair of diametrally opposed contact members in contact with the periphery of said finish adjacent the upper ends of the helical lugs,
sensing means associated with said contact members,
said contact members when in engagement with said threads measuring the diameter of said container at said lugs,
means for directing a beam of radiant energy against the periphery of the finish adjacent the upper ends of said lugs,
a first light sensitive element positioned in advance of said light beam with its line of vision intersecting the light beam at the finish of the container at an acute angle,
a second light sensitive element positioned rearwardly of said light beam with its line of vision intersecting the light beam at the finish of the container at an acute angle,
means associated with said first light sensitive element for providing a conditioning signal when the leading edge of a lug rotates into the path of the light beam thereby reducing the reflected light to said first light sensitive element,
means associated with said second light sensitive element for terminating said conditioning signal when the leading edge of a successive lug moves into the path of the light beam and reduces the light reflected to said second light sensitive element,
and means for creating a reject signal during the interval between the energization of the first light sensitive element and the energization of the second light sensitive element when said sensing means indicates a deviation of the diameter from a predetermined standard.

10. The combination set forth in claim 9 wherein said last-mentioned means includes an AND gate.

11. The combination set forth in claim 9 wherein said sensing means includes a differential transformer associated with each said contact member.

12. The combination set forth in claim 9 wherein said differential transformers are connected in opposition.

13. An apparatus for inspecting containers having interrupted helical threads on the neck finished thereof to determine the diameter of the container at said lugs which comprises
means for supporting the container for rotation about its axis,
a pair of diametrally opposed contact members in contact with the periphery of said finish adjacent the upper ends of the helical lugs,
sensing means associated with said contact members,
said contact member when in engagement with said threads measuring the diameter of said container at said lugs,
means for directing a beam of radiant energy substantially radially against the periphery of the finish adjacent the upper ends of said lugs,
light sensitive means having a line of vision intersecting the beam at the periphery of the finish at an acute angle for creating a conditioning signal when the contact members are in engagement with the lugs,
and reject means associated with and conditioned by said light sensitive means for creating a reject signal when the sensing means indicates that the diameter of the lugs varies from predetermined tolerances and during the interval of the conditioning signal.

14. An apparatus for inspecting containers having interrupted helical threads on the neck finish thereof to determine the diameter of the container at said lugs which comprises
means for supporting the container for rotation about its axis,
a pair of diametrally opposed contact members in contact with the periphery of said finish adjacent the upper ends of the helical lugs,
sensing means associated with said contact members,
said contact members when in engagement with said threads measuring the diameter of said container at said lugs,
means for directing a beam of radiant energy substantially radially against the periphery of the finish adjacent the upper ends of said lugs,
a first light sensitive element positioned in advance of said light beam with its line of vision intersecting the light beam at the finish of the container at an acute angle,
a second light sensitive element positioned rearwardly of said light beam with its line of vision intersecting the light beam at the finish of the container at an acute angle,
means associated with said first light sensitive element for providing a conditioning signal when the leading edge of a lug rotates into the path of the light beam thereby reducing the reflected light to said first light sensitive element,
means associated with said second light sensitive element for terminating said conditioning signal when the leading edge of a successive lug moves into the path of the light beam and reduces the light reflected to said second light sensitive element,
and means for creating a reject signal during the interval between the energization of the first light sensitive element and the energization of the second light sensitive element when said sensing means indicates a deviation of the diameter from a predetermined standard.

15. The combination set forth in claim 14 wherein said last-mentioned means includes an AND gate.

16. The combination set forth in claim 14 wherein said sensing means includes a differential transformer associated with each said contact member.

17. The combination set forth in claim 16 wherein said differential transformers are connected in opposition.

References Cited by the Examiner

UNITED STATES PATENTS 2,988,218   6/1961   Fedorchak et al. _____ 209—88

FOREIGN PATENTS 662,822   5/1963   Canada.

EVERETT W. KIRBY, *Primary Examiner.*